United States Patent
Duda et al.

(10) Patent No.: US 10,854,224 B1
(45) Date of Patent: Dec. 1, 2020

(54) DIFFERENTIAL RECESSED TOPOGRAPHY OF A MEDIA-FACING SURFACE

(71) Applicant: Seagate Technology LLC, Cupertino, CA (US)

(72) Inventors: John Charles Duda, Bloomington, MN (US); Vasudevan Ramaswamy, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 24 days.

(21) Appl. No.: 16/006,112

(22) Filed: Jun. 12, 2018

Related U.S. Application Data (60) Provisional application No. 62/550,956, filed on Aug. 28, 2017.

(51) Int. Cl.
  *G11B 5/48*  (2006.01)
  *G11B 5/31*  (2006.01)
  *G11B 5/11*  (2006.01)
  *G11B 5/60*  (2006.01)
  *G11B 5/00*  (2006.01)

(52) U.S. Cl.
  CPC .......... *G11B 5/4866* (2013.01); *G11B 5/112* (2013.01); *G11B 5/314* (2013.01); *G11B 5/6088* (2013.01); *G11B 2005/0021* (2013.01)

(58) Field of Classification Search
  CPC ....... G11B 5/4866; G11B 5/112; G11B 5/134; G11B 5/6088
  USPC ......................................... 360/125.3–125.35
  See application file for complete search history.

(56) References Cited

U.S. PATENT DOCUMENTS

| | | | |
|---|---|---|---|
| 5,822,153 A * | 10/1998 | Lairson ................. | B82Y 10/00 360/234.7 |
| 6,433,965 B1 | 8/2002 | Gopinathan et al. | |
| 6,661,612 B1 | 12/2003 | Peng | |
| 7,872,833 B2 | 1/2011 | Hu et al. | |
| 8,730,608 B1 * | 5/2014 | Van Eaton ............. | G11B 5/607 360/59 |
| 8,842,507 B1 * | 9/2014 | Hirano ................. | G11B 5/1278 369/112.27 |
| 8,902,549 B1 * | 12/2014 | Komagaki ........... | G11B 5/1278 360/319 |
| 8,958,180 B1 * | 2/2015 | Park ..................... | G11B 5/3912 360/319 |
| 9,036,307 B1 | 5/2015 | Hoshiya et al. | |
| 9,443,541 B1 * | 9/2016 | Liu ........................ | G11B 5/315 |
| 9,658,784 B1 * | 5/2017 | Ahmad ................. | G06F 3/0616 |
| 10,002,631 B1 * | 6/2018 | Kiely .................... | G11B 5/6076 |
| 10,410,658 B1 * | 9/2019 | Liu ......................... | G11B 5/09 |
| 2004/0130820 A1 * | 7/2004 | Ota ....................... | G11B 5/3106 360/128 |
| 2007/0109686 A1 | 5/2007 | Jose et al. | |

(Continued)

*Primary Examiner* — Allen T Cao
(74) *Attorney, Agent, or Firm* — Mueting Raasch Group (57) ABSTRACT

An apparatus comprising a slider is configured for heat-assisted magnetic recording. The slider comprises a media-facing surface. One or more reader elements are positioned in a reader region of the slider, and the one or more reader elements have an average first elevation at the media-facing surface. One or more writer elements are positioned in a writer region of the slider, and the one or more writer elements have an average second elevation at the media-facing surface. The average second elevation is less than the average first elevation.

20 Claims, 11 Drawing Sheets

(56) References Cited

U.S. PATENT DOCUMENTS

| | | | | |
|---|---|---|---|---|
| 2007/0217069 | A1* | 9/2007 | Okada | G11B 5/1278 |
| | | | | 360/125.3 |
| 2009/0122445 | A1* | 5/2009 | Jiang | G11B 5/112 |
| | | | | 360/123.12 |
| 2009/0207531 | A1* | 8/2009 | Shiimoto | B82Y 10/00 |
| | | | | 360/316 |
| 2010/0149697 | A1* | 6/2010 | Nunokawa | G11B 5/3116 |
| | | | | 360/319 |
| 2010/0321825 | A1* | 12/2010 | Nazarov | G11B 5/1278 |
| | | | | 360/125.02 |
| 2011/0116192 | A1* | 5/2011 | Fujita | G11B 5/1278 |
| | | | | 360/235.1 |
| 2011/0116193 | A1* | 5/2011 | Gubbins | G11B 5/10 |
| | | | | 360/246.2 |
| 2013/0279045 | A1* | 10/2013 | Agari | G11B 5/40 |
| | | | | 360/125.3 |
| 2014/0313872 | A1* | 10/2014 | Rawat | G11B 13/045 |
| | | | | 369/13.33 |
| 2014/0326699 | A1* | 11/2014 | Hsiao | G11B 5/855 |
| | | | | 216/22 |
| 2014/0377589 | A1* | 12/2014 | Freitag | G11B 5/3143 |
| | | | | 428/812 |
| 2015/0206550 | A1* | 7/2015 | Freitag | G11B 5/11 |
| | | | | 216/22 |
| 2016/0210994 | A1* | 7/2016 | Sasaki | G11B 5/6088 |
| 2016/0293194 | A1* | 10/2016 | Contreras | G11B 5/607 |
| 2018/0005650 | A1* | 1/2018 | Tanner | G11B 5/3116 |

\* cited by examiner

DIFFERENTIAL RECESSED TOPOGRAPHY OF A MEDIA-FACING SURFACE

RELATED APPLICATIONS

This application claims the benefit of Provisional Patent Application Ser. No. 62/550,956 filed on Aug. 28, 2017, which is hereby incorporated herein by reference in its entirety.

SUMMARY

Embodiments of the disclosure are directed to an apparatus comprising a slider configured for heat-assisted magnetic recording where the slider comprises a media-facing surface. One or more reader elements are positioned in a reader region of the slider, and the one or more reader elements have an average first elevation at the media-facing surface. One or more writer elements are positioned in a writer region of the slider, and the one or more writer elements have an average second elevation at the media-facing surface. The average second elevation is less than the average first elevation.

Further embodiments are directed to an apparatus comprising a slider configured for heat-assisted magnetic recording where the slider comprises a media-facing surface. A reader is positioned in a reader region of the slider, and the reader region comprises a dielectric material at the media-facing surface at a first elevation. A writer and a near-field transducer are positioned in a writer region of the slider, and the writer region comprises the dielectric material at the media-facing surface at a second elevation. The second elevation is less than the first elevation.

Additional embodiments are directed to an apparatus comprising a slider configured for heat-assisted magnetic recording. One or more reader elements are positioned in a reader region of the slider. The reader region extends across the crosstrack dimension of the slider and is configured to have a first passive fly-height with respect to a medium. One or more writer elements are positioned in a writer region of the slider. The writer region extends across the crosstrack dimension of the slider and is configured to have a second passive fly-height with respect to the medium. The second passive fly-height is greater than the first passive fly-height.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification, the appended drawings are referenced wherein.

The figures are not necessarily to scale. Like numbers used in the figures refer to like components. However, the use of a number to refer to a component in a given figure is not intended to limit the component in another figure labeled with the same number.

DETAILED DESCRIPTION

The present disclosure relates to heat-assisted magnetic recording (HAMR), which can be used to increase areal data density of magnetic media. HAMR may also be referred to as energy assisted magnetic recording (EAMR), thermally assisted magnetic recording (TAMR), and thermally assisted recording (TAR). In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, a magnetoresistive sensor reads data by detecting magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider also includes a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., ABS, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region reaching or exceeding the Curie temperature ($T_c$) and having dimensions less than 100 nm (e.g., ~50 nm).

Figure 1:
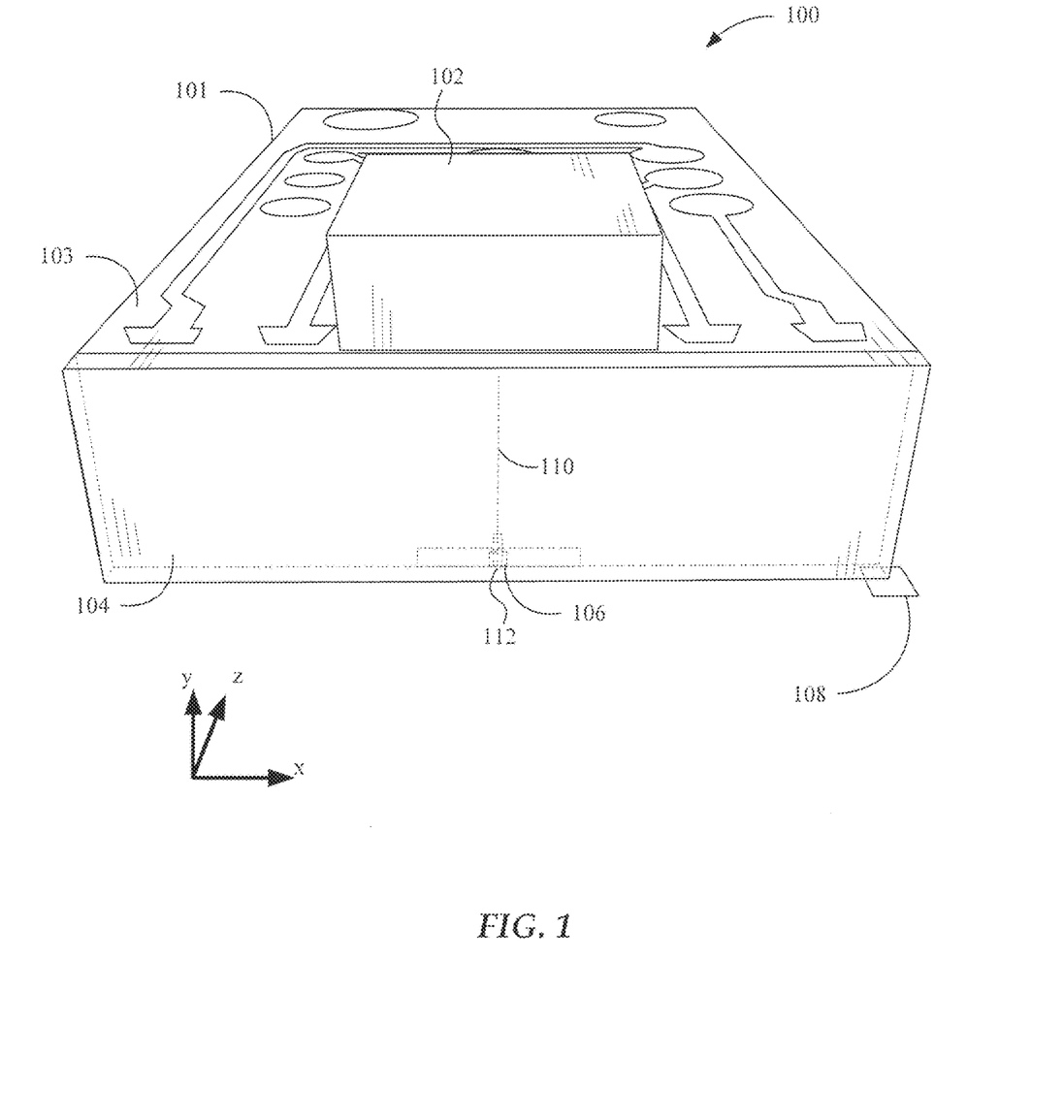
FIG. 1 is a perspective view of a HAMR slider assembly according to embodiments discussed herein.

With reference to FIG. 1, a perspective view shows a HAMR slider assembly 100 according to a representative embodiment. The slider assembly 100 includes a laser diode 102 located on input surface 103 of a slider body 101. In this example, the input surface 103 is a top surface, which is located opposite a media-facing surface 108 that is positioned over a surface of a recording media (not shown) during device operation. The media-facing surface 108 faces, and is held proximate to, the moving media surface while reading and writing to the media. The media-facing surface 108 may be configured as an air-bearing surface (ABS) that maintains separation from the media surface via a thin layer of air. The laser diode 102 delivers light to a region proximate a HAMR read/write head 106, which is located near the media-facing surface 108. The energy heats the recording media as it passes by the read/write head 106. Optical coupling components, such as a waveguide system 110, are integrally formed within the slider body 101 (e.g., near a trailing edge surface 104 of the slider) and function as an optical path that delivers energy from the laser diode 102 to the recording media via a NFT 112. The NFT 112 is proximate the writer of the read/write head 106 and causes heating of the media during recording operations.

The laser diode 102 may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser may be directly coupled to the slider body 101, or via an intermediary component such as a submount (not shown). A submount can be used to orient an edge-emitting laser so that its output is directly downwards (negative y-direction and substantially perpendicular to the media-facing surface).

While the representative embodiment in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be externally mounted to the slider 100, and coupled to the slider by way of optic fiber and/or a waveguide. An input surface of the slider body 103 may include a grating or other coupling feature to receive light from the laser via the optic fiber and/or waveguide.

Figure 2:
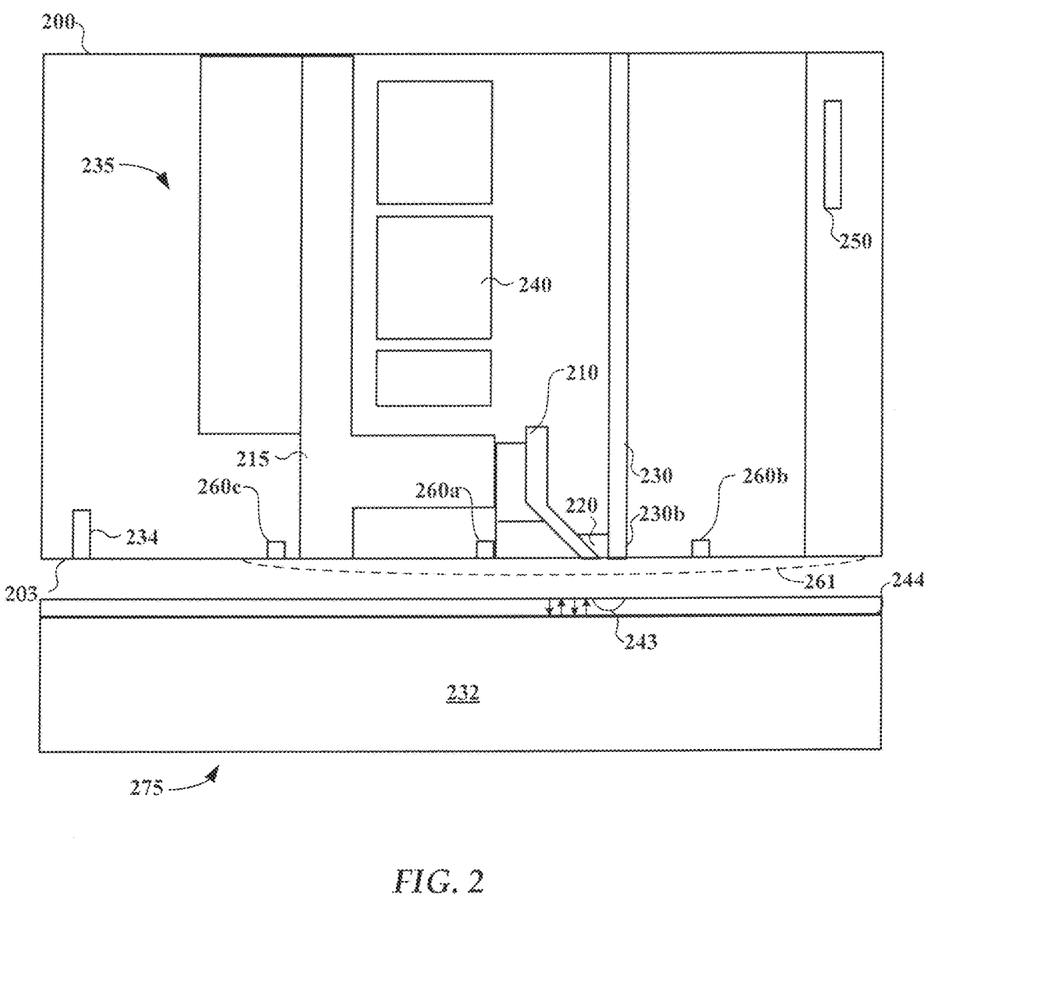
FIG. 2 is a cross-sectional view of a slider assembly, according to embodiments discussed herein.

In FIG. 2, a cross-section diagram shows a slider 200 according to various embodiments. The head transducer 200 is shown positioned over a writeable medium 275 (e.g., magnetic disk) and generally includes a substrate 232 on which at least a hard magnetic layer 244 is deposited or otherwise formed. An NFT 220 is located between a write pole 210 and a waveguide 230 at a media-facing surface 203. A small portion or spot 243 of the layer 244 is heated via waveguide 230 and NFT 220 to reduce the coercivity of the material enough so that the magnetic field from the magnetic write pole 210 is strong enough to change the magnetization direction of the recording layer 244. Bits of information may then be recorded in the form of a perpendicular upward/downward magnetization direction for a series of magnetic domains in the layer 244.

The portion of head transducer 200 illustrated in FIG. 2 may include a number of heat generating components at the media-facing surface 203, such as write coil 240, NFT 220, and a heater 250. Due to thermal expansion of the surrounding material (e.g., dielectric material), the heat can cause a thermal protrusion at the media-facing surface 203, indicted by dashed line 261. Generally, the heater 250 is used to finely adjust head-media spacing near the protrusion to obtain a desired spacing between the media 275 and read/write transducers 234, 235. This head-media spacing can also be referred to as the slider's fly height.

One or more thermal sensors, e.g., temperature coefficient of resistance (TCR) sensors or dual-ended temperature coefficient of resistance (DETCR) sensors, can be located within a protrusion region at one or more optional locations. Historically these sensors have been used during manufacturing to set head-disk spacing. Thermal sensors may also be used for thermal asperity (TA) detection. As shown in FIG. 2, optional thermal sensors 260a, 260b, 260c are located at different locations within the region of protrusion 261. In many embodiments, only one thermal sensor is used. In some embodiments, as illustrated by thermal sensor 260a, a thermal sensor is located in the region of the writer 235, near the write pole 210, return pole 215, and/or the NFT 220.

Thermal sensors 260a, 260b, 260c are coupled to signal processing circuitry as is known in the art. The circuitry determines temperatures at or near the media-facing surface 203, and those measured temperatures can be used for a number of purposes, such as controlling the heater 250 to adjust head-media spacing at the protrusion region 261. It has been demonstrated that for a head transducer having a thermal sensor reasonably close to the NFT 220, it is possible to measure changes in thermal conductance across the head-disc interface and to use this to monitor changes, such as those due to clearance changes or due to contamination.

Figure 3:
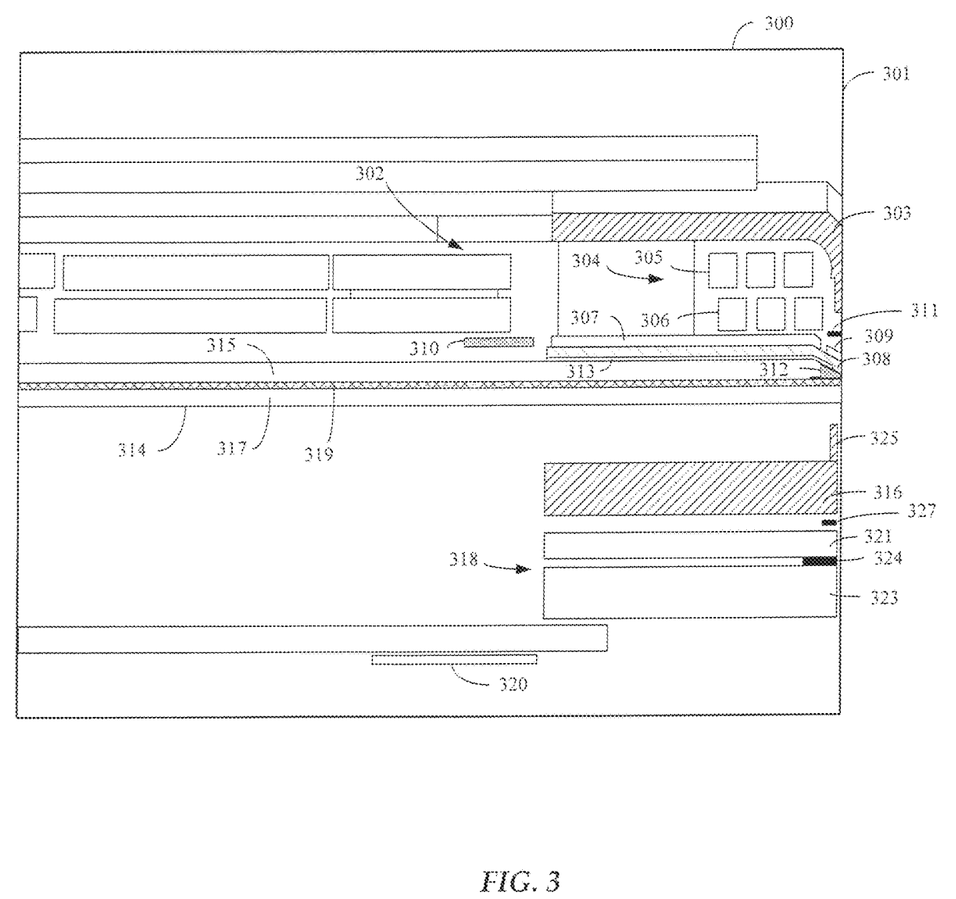
FIG. 3 is a cross-sectional view of portions of a slider body near an air-bearing surface (ABS) according to embodiments discussed herein.

In FIG. 3, a cross-sectional view illustrates portions of the slider body 300 near the media-facing ABS 301 in further detail according to various embodiments. A writer 302 includes a number of components, including a second return pole 303 proximate a write coil 304. The write coil 304 includes an upper coil 305 and a lower coil 306. The write coil 304 may conform to any writer coil design, including a double-pancake design, single-layer pancake design, or a helical coil design, for example.

The write coil 304 is configured to energize a write pole 308. A magnetic yoke 307 is disposed between the write coil 304 and the write pole 308. A write pole heat sink 309 is thermally coupled to the write pole 308. A writer heater 310 is positioned proximate the write pole 308 and is configured to thermally actuate the write pole 308 during write operations. An NFT 312 is situated proximate the write pole 308 and is optically coupled to an optical waveguide 314. The waveguide 314 includes an upper cladding layer 315, a lower cladding layer 317, and a core 319 between the upper and lower cladding layers 315, 317. A diffuser 313 thermally couples to the NFT 312 and extends between at least a portion of the write pole 308 and the upper cladding layer 315. The writer 302 also includes a leading shield 325 and a first return pole 316, which is magnetically coupled to the write pole 308 and the second return pole 303. The slider 300 also includes a reader 318. The reader 318 includes a read element 324 (e.g., a GMR sensor) disposed between a pair of reader shields 321, 323. A reader heater 320 is located proximate the reader 318, which is configured to thermally actuate the reader 318 during read operations.

A contact sensor 311 is positioned at or near the ABS 301 near the write coil 304. More particularly, the contact sensor 311 is positioned proximate the write coil 304 and the write pole 308. At this location, the contact sensor 311 is arranged to detect contact between a close point of the writer 302 (when thermally actuated by one or more heating elements) and a magnetic recording medium. The slider 300 also includes a contact sensor 327 positioned proximate the reader 318. The contact sensor 327 is configured to detect contact between a close point of the reader 318 (when thermally actuated by one or more heating elements) and the recording medium. In some embodiments, the writer contact sensor 311 is coupled (in series or in parallel) to the reader contact sensor 327. In other embodiments, the writer and reader contact sensors 311 and 327 are independent of each other.

Figure 4A:
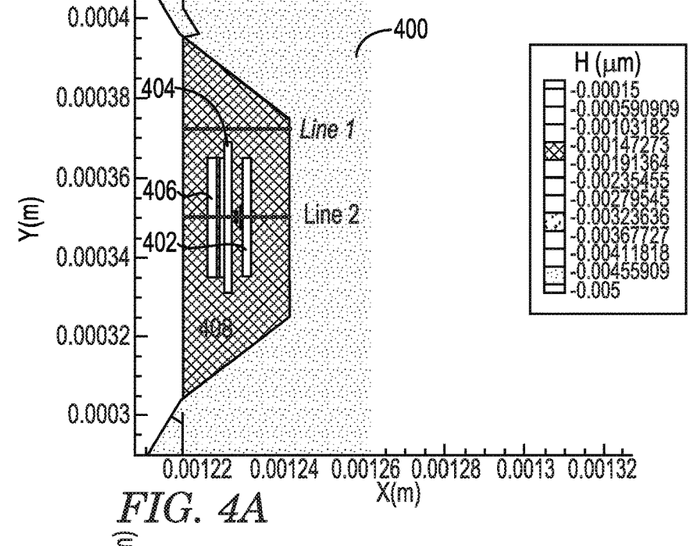
FIG. 4A is a plan view of a slider ABS including elevations for the illustrated structures of a baseline configuration.
Figure 4B:
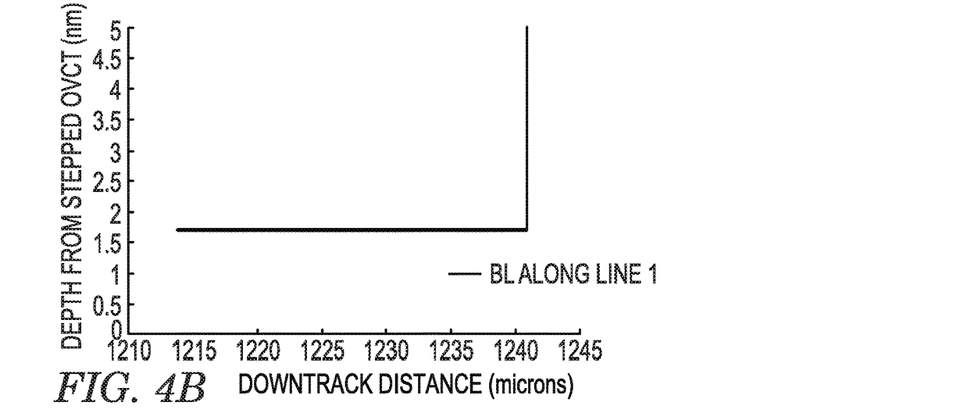
FIG. 4B is a graph showing the elevation profile along Line 1 of FIG. 4A.
Figure 4C:
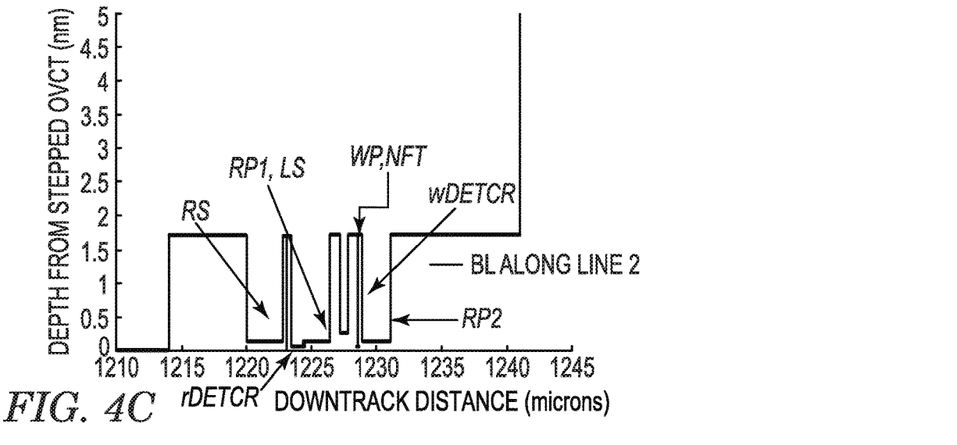
FIG. 4C is a graph showing the elevation profile along Line 2 of FIG. 4A.

Turning to FIGS. 4A-C, the elevations of components at the ABS are shown for a passive (non-heated) slider 400 (e.g., a baseline (BL) elevation example). FIG. 4A shows a plan view of the ABS and dimensions for a slider with the shading representing relative elevations of the respective components. For example, the white shaded portion of the ABS positioned at 1210 to about 1214 microns in the downtrack direction has a higher elevation than the black shaded portion (e.g., beginning at 1240 microns in the downtrack direction). In other terms, the shading, as indicated in the sidebar of FIG. 4A, represents the clearance height (H) in micrometers. For example, higher clearance height (e.g., the black shaded portion) corresponds to a lower ABS elevation. The grey shaded portion positioned at about 1214 to 1240 microns is the portion of the ABS where the read/write components are located and is the portion discussed further herein.

In the grey shaded portion, the second return pole (RP2) 402, the first return pole/leading shield (RP1, LS) 404, and the reader shields (RS) 406 all have about the same elevation. The surrounding dielectric 408 in the grey shaded portion (e.g., portion of interest) of the slider has a comparable, but slightly lower elevation. As can be seen in FIG. 4B, the dielectric 408 has a substantially consistent elevation. Taking the elevation along Line 1 of FIG. 4A as an example, the ABS elevation is between 1.5 and 2 nm less than the white shaded portion of the slider ABS. If Line 1 extended to the y-axis in FIG. 4A, it would be indicated by the graph of FIG. 4B starting at zero on the x- and y-axis and having a vertical step at about 1214 microns, which is the starting point of FIG. 4B and Line 1. Similarly, the vertical step shown at 1240 microns in the downtrack direction corresponds to the end of the grey-shaded region and generally represents a change in elevation without identifying the specific elevation of the black shaded portion. Since there are no read/write components in the white (or black) shaded regions of the ABS, the elevations of these regions are not always included in the following figures. The slider dielectric 408 is typically a single material such as alumina (AlO), AlN, silicon nitride, silicon oxynitride, $SiO_2$, etc. Similarly, using Line 2 of FIG. 4A as an example, the read/write components at the ABS have a substantially consistent elevation as depicted in FIG. 4C. Each of the components: reader shields (RS) 406, reader sensor (rDETCR), first return pole/leading shield (RP1, LS) 404, write pole (WP), near-field transducer (NFT), writer sensor (wDETCR), and second return pole (RP2) 402 has an elevation of less than 0.5 nm from the major surface of the ABS. Thus, all of the read/write components have substantially similar elevations at the ABS.

FIGS. 4A-C illustrate an ABS with a substantially planar elevation. However, FIGS. 4A-C depict a slider 400 in a passive (no-heat) state. Without being thermally activated, the slider 400 can maintain a consistent fly-height across the ABS. With HAMR, the fly-height is higher than in conventional recording (16-21 nm in HAMR vs. 7-9 nm perpendicular magnetic recording) in order to accommodate protrusions of the ABS and their sigmas, especially near the writer during HAMR write conditions. As shown in FIG. 2, when one or more components of the slider 400 are activated, the heat generated causes one or more portions of the ABS to protrude toward the recording media. Using the components of FIGS. 1 and 3 as examples, one or more of a writer heater 310, write coil 304, energy source (e.g., laser diode) 102, and reader heater 320 generates heat when activated. The ABS then protrudes proximate the one or more thermally activated components (e.g., write pole 308, NFT 312). However, increasing the fly-height to accommodate protrusions of the writer, further increases the distance between the reader and recording medium. This, in turn, increases the amount of heater power needed for the reader and other sensing components to function (e.g., to stroke) and increases temperatures for the heaters, reader, etc. In order to maintain the head-media spacing for the reader while accommodating protrusions near the writer, a recessed portion comprising writing components of the ABS is formed. A recessed portion of the ABS comprising at least the write pole, NFT, writer sensor, and second return pole, provides for higher clearance (fly-height) in a passive state for these components than for components near the reader. Examples of recessed portions are shown in further detail below.

Figure 5A:
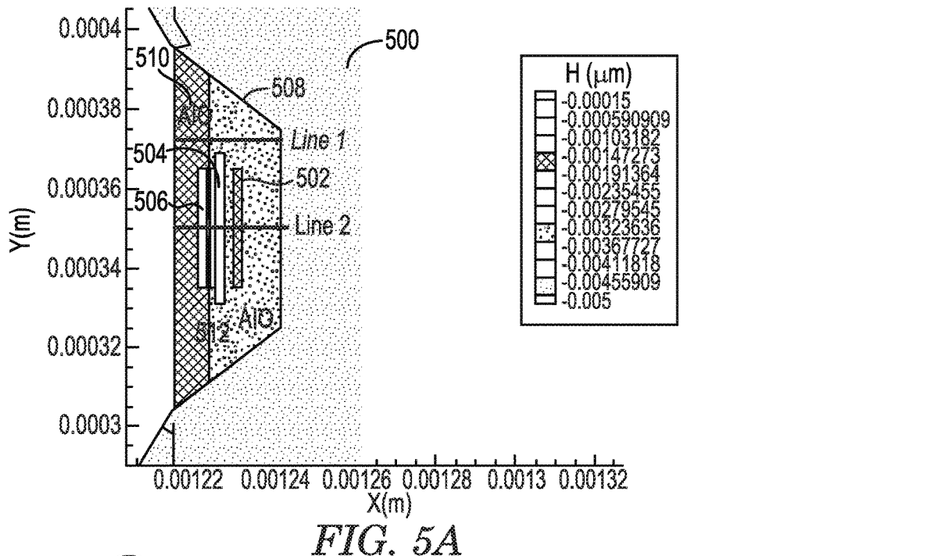
FIG. 5A is a plan view of a slider ABS including elevations for the illustrated structures where a recessed portion includes the first return pole and the leading shield according to embodiments discussed herein.

FIG. 5A shows dimensions and the elevations of components at the ABS for a passive (non-heated) slider 500 having a recessed portion. In FIG. 5A, the shading and dimensions are the same as those illustrated in FIG. 4A and represent relative elevations of the respective components for a plan view of the ABS. For example, the lighter shaded portion 510 has a higher elevation than the darker shaded portion 508. These two regions share an interface at approximately 1223 microns in the downtrack direction. The interface is a stepped interface of essentially a sharp step, or decline in elevation from portion 510 to portion 508. The interface extends across the entire slider 500 in the crosstrack direction. Thus, the recessed portion 508 comprises a substantially consistent recessed elevation from 1223 microns to 1240 microns in the downtrack direction and expanding across this downtrack region of the slider 500 in the crosstrack direction. However, in certain embodiments, the recessed region may not extend across the entire crosstrack dimension of the slider 500. As shown, the recessed portion 508 includes the second return pole (RP2) 502 and the first return pole/leading shield (RP1, LS) 504. In contrast, the reader shields 506 are located in the non-recessed portion 510 of the ABS.

Figure 5B:
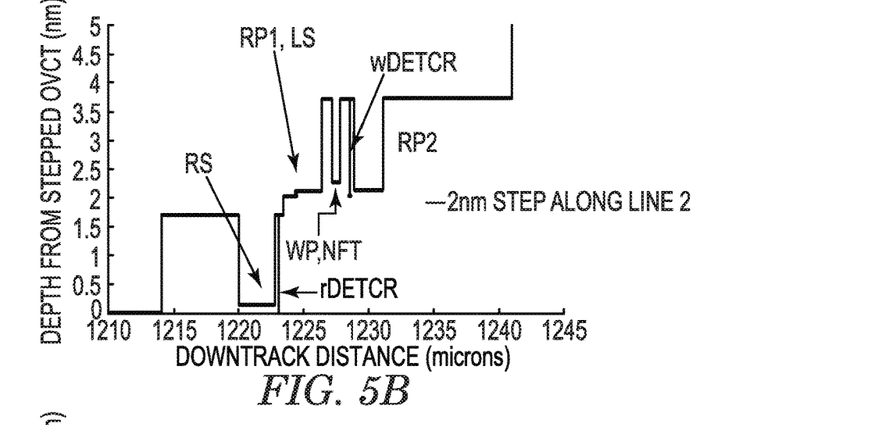
FIG. 5B is a graph showing the elevation profile along Line 2 of FIG. 5A for a 2 nm stepped recession according to embodiments discussed herein.
Figure 5C:
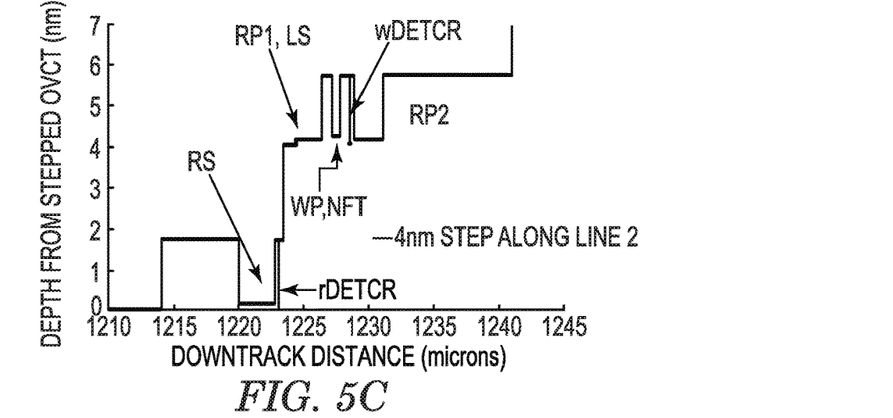
FIG. 5C is a graph showing the elevation profile along Line 2 of FIG. 5A for a 4 nm stepped recession according to embodiments discussed herein.

Using Line 2 of FIG. 5A, FIGS. 5B-C illustrate the elevations of the read/write components at the ABS for a slider having a 2 nm stepped recession (FIG. 5B) and a 4 nm stepped recession (FIG. 5C). As shown, the components in the reader region 510 (i.e., the non-recessed portion) have a substantially consistent elevation. In both FIGS. 5B-C, the components in the reader region 510 include the reader shields 506 and the reader sensor (rDETCR). Similarly, the components in the writer region 508 (i.e., the recessed portion) have a substantially consistent elevation, although at a different, lower, elevation than that of the reader region 510. Consistent with FIG. 5A, the stepped interface between the reader region 510 and writer region 508 occurs at approximately 1223 microns in the downtrack direction. In FIG. 5B, the writer components are shown having an elevation (e.g., an average elevation of each of the components in the writer region) of about 2 nm less than the average elevation of the reader components. In FIG. 5C, the writer components are shown having an elevation (e.g., an average elevation of each of the components in the writer region) of about 4 nm less than the average elevation of the reader components. Thus, along Line 2 the ABS has a stepped topography with an abrupt elevation change of 2 nm (FIG. 5B) or 4 nm (FIG. 5C) extending across the crosstrack dimension of the slider 500 at a position (e.g., 1223 microns in the downtrack direction) that recesses the write components including the return pole/leading shield 504, write pole, NFT, writer sensor (wDETCR), and the second return pole 502.

Figure 5D:
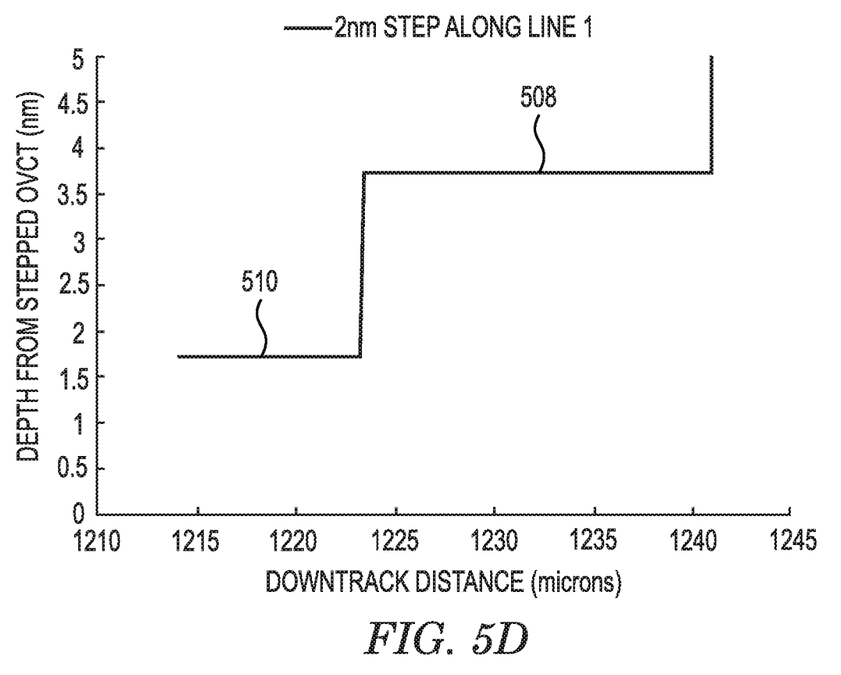
FIG. 5D is a graph showing the elevation profile along Line 1 of FIG. 5A for a 2 nm stepped recession according to embodiments discussed herein.
Figure 5E:
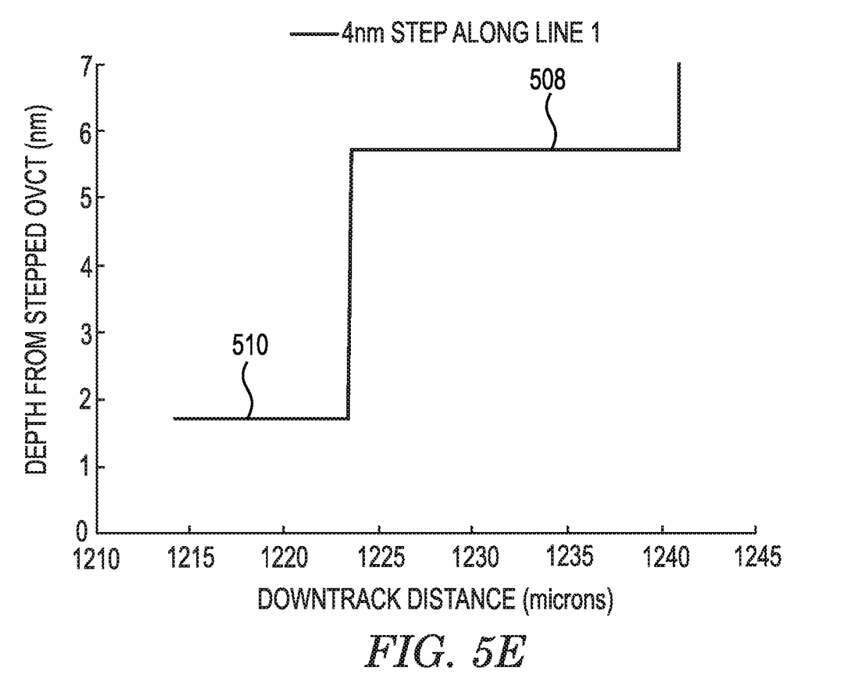
FIG. 5E is a graph showing the elevation profile along Line 1 of FIG. 5A for a 4 nm stepped recession according to embodiments discussed herein.

While the slider dielectric 512 remains a single material, e.g., alumina, the dielectric 512 has distinct elevations at the ABS in the different regions 508, 510. This is illustrated in the elevation profiles of FIGS. 5D-E taken along Line 1 of FIG. 5A. The dielectric 512 has a first elevation (e.g., about 1.8 nm) in the reader region 510 of the ABS and a second elevation (e.g., about 3.8 nm in FIG. 5D and 5.8 nm in FIG. 5E) in the writer region 508. The stepped interface for both FIGS. 5D and 5E is shown as a sharp decrease in elevation at the 1223 micron position in the downtrack direction. While the interface is described as "stepped" and is shown as a sharp, vertical interface, in certain embodiments, the interface could be more gradual (i.e., sloped), incremental, or tiered (i.e., multiple, smaller, stepped elevation changes). Thus, the dielectric has two, different substantially consistent elevations in the disparate regions 508, 510.

Figure 6A:
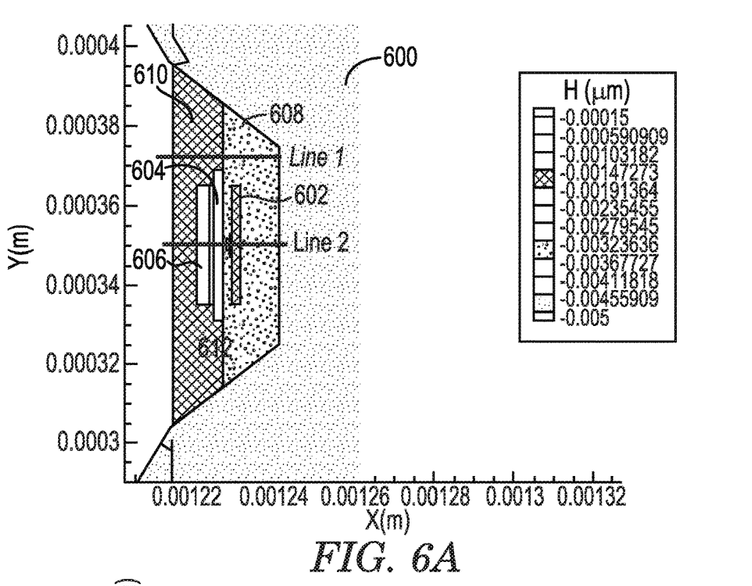
FIG. 6A is a plan view of a slider ABS including elevations for the illustrated structures where a non-recessed portion includes the first return pole and the leading shield according to embodiments discussed herein.

FIG. 6A shows dimensions and the elevations of components at the ABS for a passive (non-heated) slider 600 having a recessed portion. In FIG. 6A, the shading and dimensions are the same as those illustrated in FIG. 4A and represent relative elevations of the respective components for a plan view of the ABS. For example, the lighter shaded portion 610 has a higher elevation than the darker shaded portion 608. These two regions share an interface at approximately 1227 microns in the downtrack direction. The interface is a stepped interface of essentially a sharp step, or decline in elevation from portion 610 to portion 608. The interface extends across the entire slider 600 in the crosstrack direction. Thus, the recessed portion 608 comprises a substantially consistent recessed elevation from 1227 microns to 1240 microns in the downtrack direction and expanding across this downtrack region of the slider 600 in the crosstrack direction. However, in certain embodiments, the recessed region may not extend across the entire crosstrack dimension of the slider 600. As shown, the recessed portion 608 includes the second return pole (RP2) 602. In contrast, the first return pole/leading shield (RP1, LS) 604 and the reader shields 606 are located in the non-recessed portion 610 of the ABS.

Figure 6B:
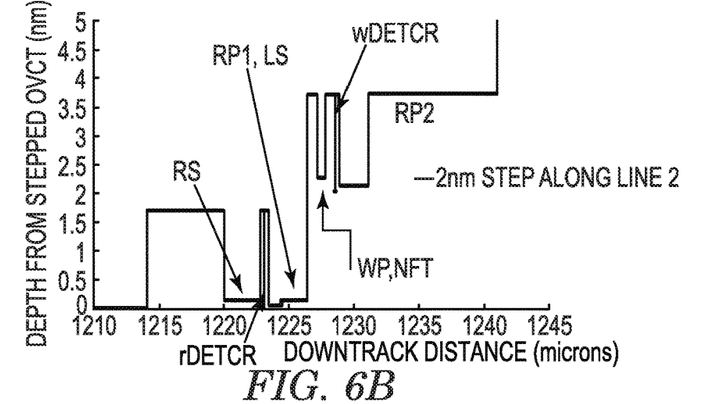
FIG. 6B is a graph showing the elevation profile along Line 2 of FIG. 6A for a 2 nm stepped recession according to embodiments discussed herein.
Figure 6C:
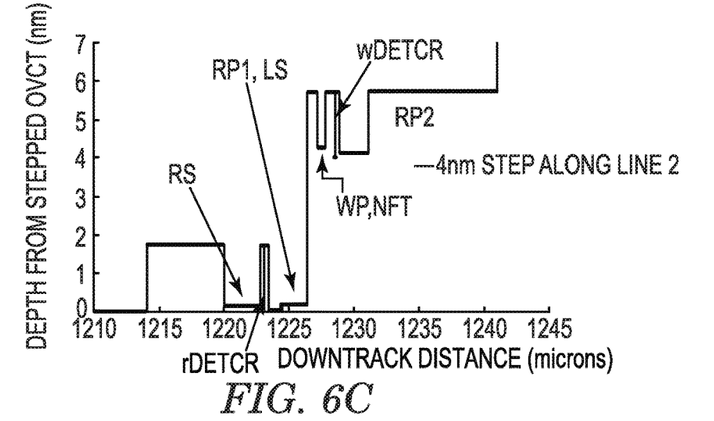
FIG. 6C is a graph showing the elevation profile along Line 2 of FIG. 6A for a 4 nm stepped recession according to embodiments discussed herein.

Using Line 2 of FIG. 6A, FIGS. 6B-C illustrate the elevations of the read/write components at the ABS for a slider having a 2 nm stepped recession (FIG. 6B) and a 4 nm stepped recession (FIG. 6C). As shown, the components in the reader region 610 (i.e., the non-recessed portion) have a substantially consistent elevation. In both FIGS. 6B-C, the components in the reader region 610 include the reader shields 606, the reader sensor (rDETCR), and the return pole/leading shield 604. Similarly, the components in the writer region 608 (i.e., the recessed portion) have a substantially consistent elevation, although at a different, lower, elevation than that of the reader region 610. Consistent with FIG. 6A, the stepped interface between the reader region 610 and writer region 608 occurs at approximately 1227 microns in the downtrack direction. In FIG. 6B, the writer components are shown having an elevation (e.g., an average elevation of each of the components in the writer region) of about 2 nm less than the average elevation of the reader components. In FIG. 6C, the writer components are shown having an elevation (e.g., an average elevation of each of the components in the writer region) of about 4 nm less than the average elevation of the reader components. Thus, along Line 2 the ABS has a stepped topography with an abrupt elevation change of 2 nm (FIG. 6B) or 4 nm (FIG. 6C) extending across the crosstrack dimension of the slider 600 at a position (e.g., 1227 microns in the downtrack direction) that recesses the write components including the write pole, NFT, writer sensor (wDETCR), and the second return pole 602.

Figure 6D:
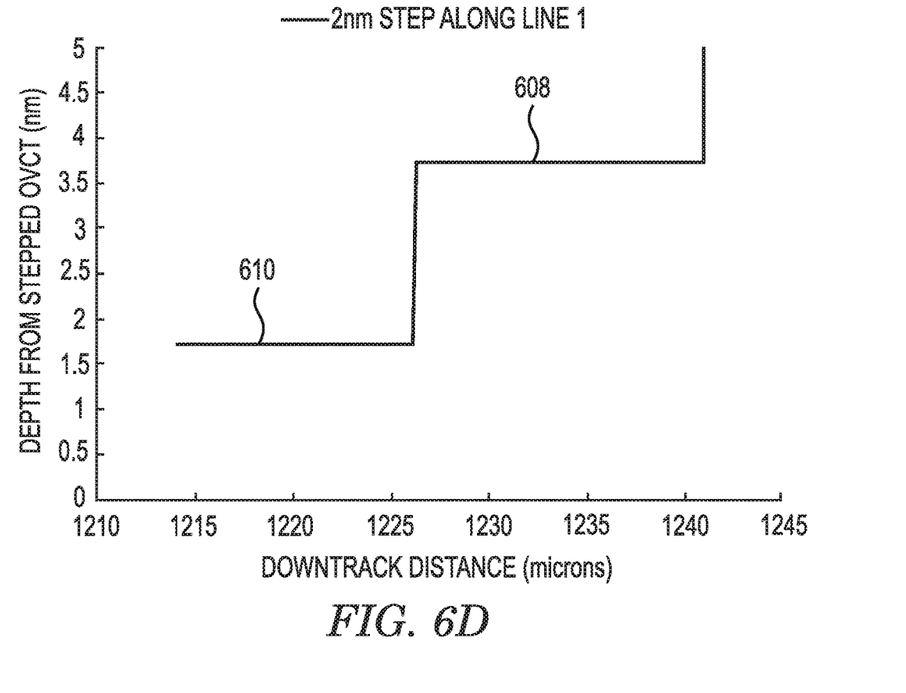
FIG. 6D is a graph showing the elevation profile along Line 1 of FIG. 6A for a 2 nm stepped recession according to embodiments discussed herein.
Figure 6E:
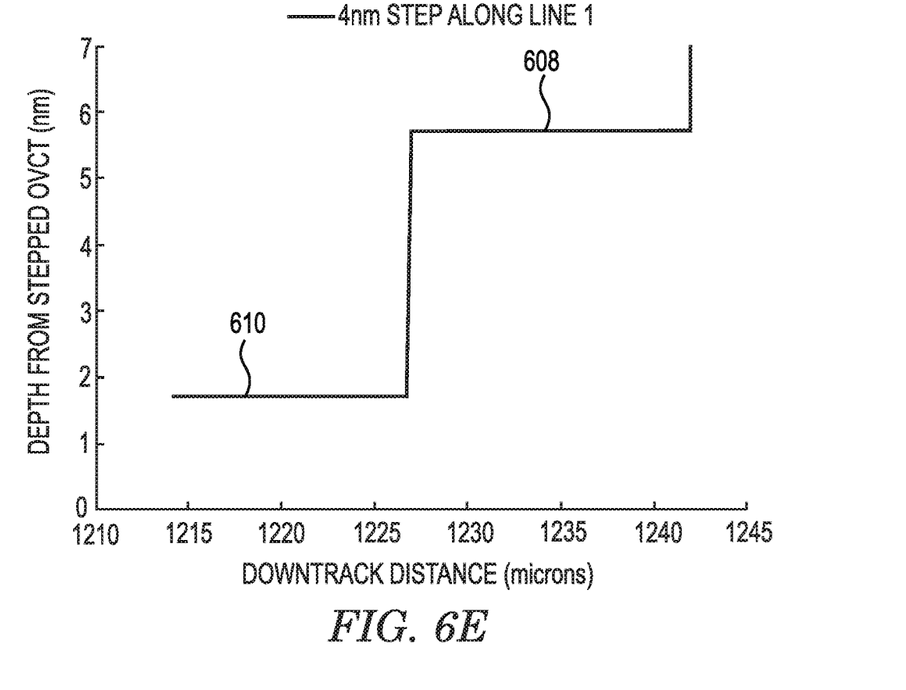
FIG. 6E is a graph showing the elevation profile along Line 1 of FIG. 6A for a 4 nm stepped recession according to embodiments discussed herein.

While the slider dielectric 612 remains a single material, e.g., alumina, the dielectric 612 has distinct elevations at the ABS in the different regions 608, 610. This is illustrated in the elevation profiles of FIGS. 6D-E taken along Line 1 of FIG. 6A. The dielectric 612 has a first elevation (e.g., about 1.8 nm) in the reader region 610 of the ABS and a second elevation (e.g., about 3.8 nm in FIG. 6D and 5.8 nm in FIG. 6E) in the writer region 608. The stepped interface for both FIGS. 6D and 6E is shown as a sharp decrease in elevation at the 1227 micron position in the downtrack direction. While the interface is described as "stepped" and is described as a sharp, vertical interface, in certain embodiments, the interface could be more gradual (i.e., sloped), incremental, or tiered (i.e., multiple, smaller, stepped elevation changes). Thus, the dielectric has two, different substantially consistent elevations in the disparate regions 608, 610.

Figure 7:
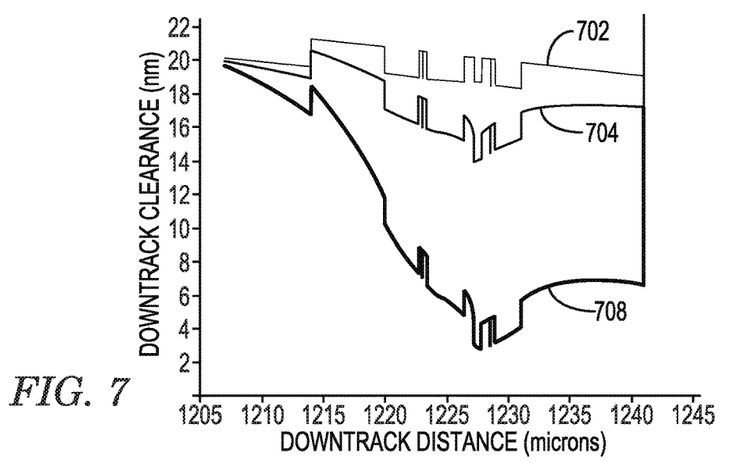
FIG. 7 is a graph showing elevation profiles of a slider ABS without a recessed portion.

The recessed portion of the ABS not only facilitates a decreased fly-height, it also changes the shape of the ABS protrusion. The close point is the position on the protruded ABS that is closest to the recording medium. The close point of a slider can vary depending on which, how many, or the amount of power supplied to, heat-generating elements that are activated. FIG. 7 shows elevation profiles for a slider without a recessed portion (similar to that depicted in FIG. 4A) in different power-up scenarios. In a passive state (no heat) profile 702 indicates that the ABS, including the read and write components, is approximately planar at a clearance of 20 nm. Profile 704 represents a scenario of intermediate heating (i.e., only the energy source (laser) is activated). As a result, the writer components protrude and decrease the clearance/fly-height to about 15 nm. In profile 708, the writer heater, write coil, and laser are all activated representing a writing operation scenario and resulting in further protrusion.

Figure 8:
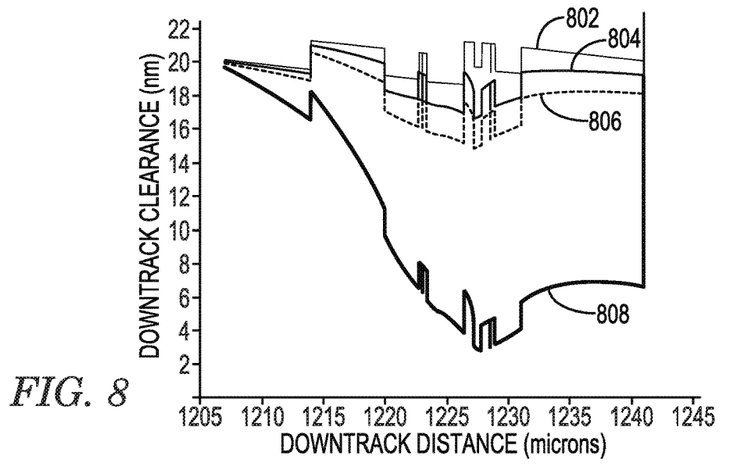
FIG. 8 is a graph showing elevation profiles of a slider ABS having a 1 nm recessed portion according to embodiments discussed herein.
Figure 9:
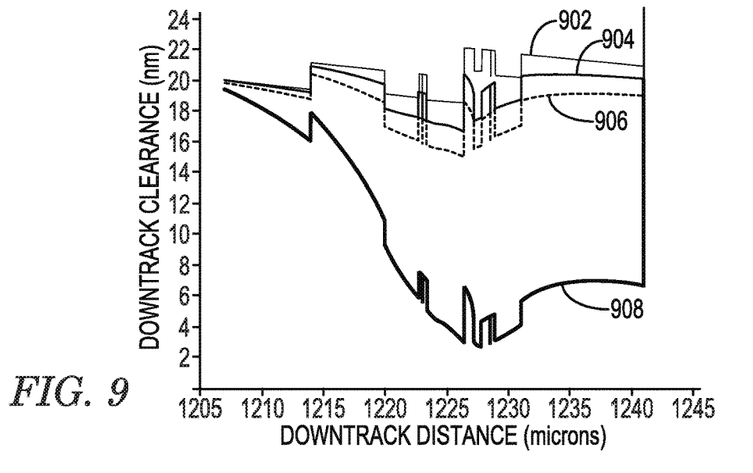
FIG. 9 is a graph showing elevation profiles of a slider ABS having a 2 nm recessed portion according to embodiments discussed herein.

FIGS. 8 and 9 show elevation profiles for sliders with recessed portions, as discussed above. FIG. 8 shows elevation profiles for a slider with a 1 nm recessed portion in different power-up scenarios. In a passive state (no heat), profile 802 indicates that the reader components at the ABS have a clearance/fly-height of about 20 nm, while the writer components at the ABS have a clearance/fly-height of about 21 nm. For example, the elevations of the various components in the writer region (e.g., first return pole/leading shield, write pole, NFT, writer sensor, and second return pole) are averaged and compared with an average elevation for the components in the reader region (e.g., reader shields, reader, and reader sensor). This indicates that the average ABS clearance for the writer region is about 1 nm greater than that of the reader region of the ABS. Profiles 804 and 806 represent the protrusion progression for scenarios where additional heating elements are activated. In profile 804, where only the laser is activated, the writer components start to protrude to about the same elevation as the reader region and decrease the clearance/fly-height to about 17 nm. In profile 806, where both the laser and write coil are activated, the writer components protrude to a clearance/fly-height of about 16 nm. In profile 808, the writer heater, write coil, and laser (energy source) are all activated resulting in further protrusion.

FIG. 9 shows elevation profiles for a slider with a 2 nm recessed portion (similar to the slider depicted in FIGS. 5A-B) in different power-up scenarios. In a passive state (no heat), profile 902 indicates that the reader components at the ABS have a clearance/fly-height of about 20 nm, while the writer components at the ABS have a clearance/fly-height of about 22 nm. For example, the elevations of the various components in the writer region (e.g., write pole, NFT, writer sensor, and second return pole) are averaged and compared with an average elevation for the components in the reader region (e.g., first return pole/leading shield, reader shields, reader, and reader sensor). This indicates that the average ABS clearance for the writer region is about 2 nm greater than that of the reader region of the ABS. Profiles 904 and 906 represent the protrusion progression for scenarios where additional heating elements are activated. In profile 904, where only the laser is activated, the writer components start to protrude to about the same elevation as the reader region and decrease the clearance/fly-height to about 17 nm. In profile 906, where both the laser and write coil are activated, the writer components protrude to a clearance/fly-height of about 16 nm. In profile 908, the writer heater, write coil, and laser (energy source) are all activated resulting in further protrusion. In addition to the above-described sliders with stepped recessions of one and two nanometers, recessions of 3-5 nanometers were also simulated.

Figure 10:
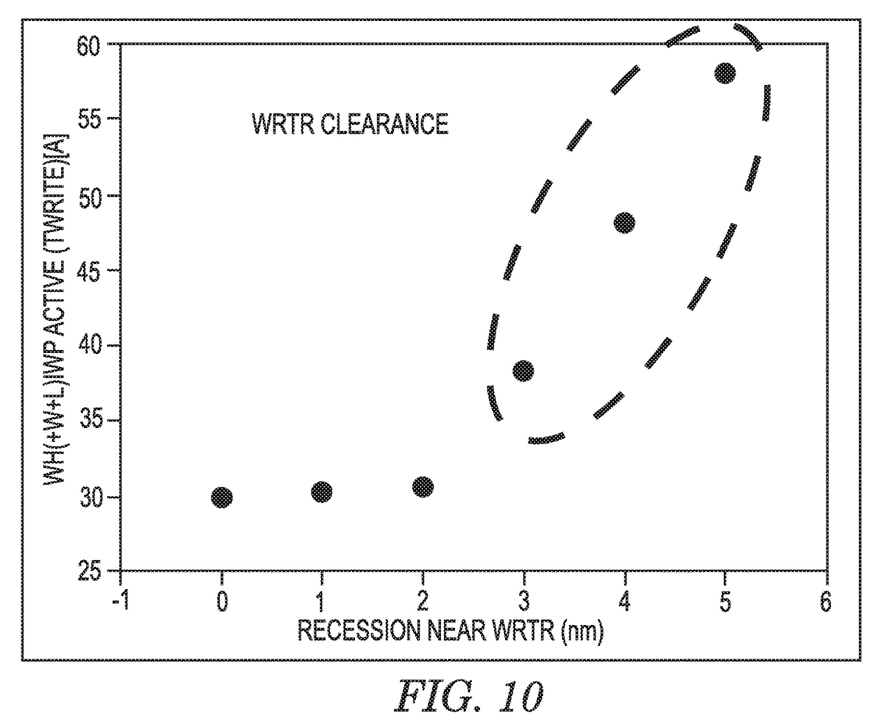
FIG. 10 is a chart showing fly-height of a writer portion of a slider as a function of a recessed portion of the slider according to embodiments discussed herein.
Figure 11:
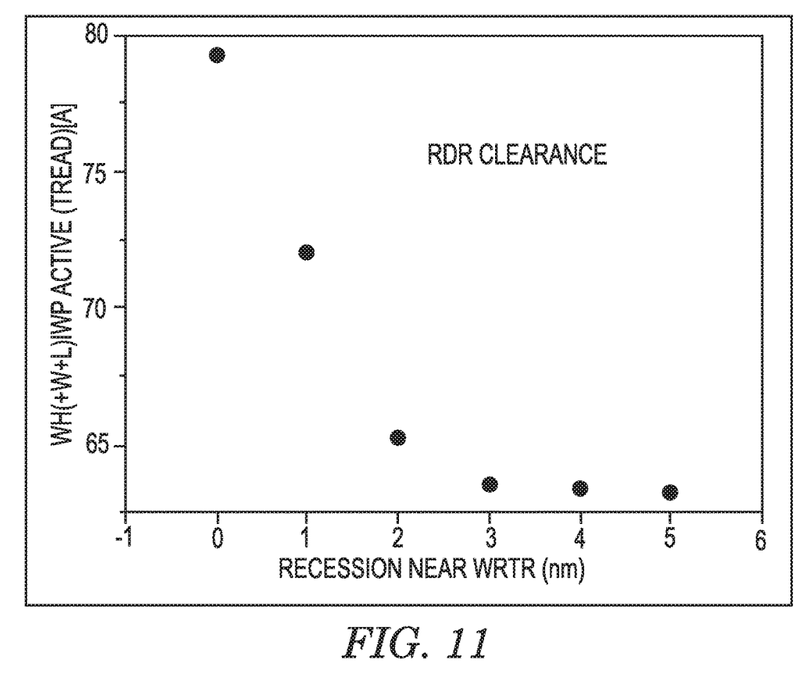
FIG. 11 is a chart showing fly-height of a reader portion of a slider as a function of a recessed portion of the slider according to embodiments discussed herein.

When comparing profiles 708, 808, and 908, the shape of the ABS protrusion varies with the increased depth of the recessed portion. For example, the curvature of the protrusion slightly flattens as the recession is increased from zero to two nanometers, which results in a repositioning of the close point. FIG. 10 shows the writer clearance during an energized state (e.g., profiles 708, 808, 908) as a function of the depth of a recessed portion of the ABS. While clearance (effectively, the close point) for profiles 708, 808, and 908 are substantially consistent at about 30 angstroms, increasing the recession to three, or more nanometers, significantly increases the writer clearance as shown by the circled data points. In contrast, FIG. 11 shows the reader clearance during an energized state (e.g., profiles 708, 808, 908) as a function of the depth of a recessed portion of the ABS. FIG. 11 illustrates that increasing the amount/depth of recession (e.g., beyond 3 nm) distorts the protrusion at the ABS such that the close point is repositioned closer to the reader. This undermines the read/write functionality of the writer and the slider overall.

The thermal-mechanical modeling results displayed in FIGS. 7-11 indicate that a stepped recession of about 2 nm, and not more than 3 nm, near the writer components does not significantly change the close points at the ABS for various power-up scenarios (e.g., writer heater only; writer heater and write coil; writer heater, write coil, and laser; and reader heater only) as compared with a baseline slider (no stepped recession). For this scenario of read/write components, 2-3 nm of recession has been demonstrated as useful. However, there are other scenarios, e.g., when there is a larger spacing between the reader and the writer element, where a greater than 3 nm step recession may work without this drawback. The higher fly-height for the writer components due to a stepped recession increases the writer heater power-to-contact resulting in higher temperatures at the writer heater (e.g., 25° C. higher) and at the ABS, including the write pole and NFT, (e.g., 8° C. higher). Other thermal mechanical metrics for the energized scenario (e.g., writer heater, write coil, and laser activated) are similar to those of a baseline configuration (i.e., no stepped recession). For example, the laser induced writer slope and laser induced reader slope are within 3-9% of a baseline configuration. In addition, stroke efficiency (A/mW) is within 8%, and the Gamma close point is within 10% of a baseline configuration. Because the position of the close point does not significantly change with a stepped recession of about 2 nm, the slider can fly about 2 nm lower. Since a reader experiences a temperature rise of about 0.4° C./angstrom during reader heater operation, the reader can operate at about 8° C. lower than at the higher fly-height. The decreased operating temperature leads to increased reliability and longevity for the slider components.

Figure 12:
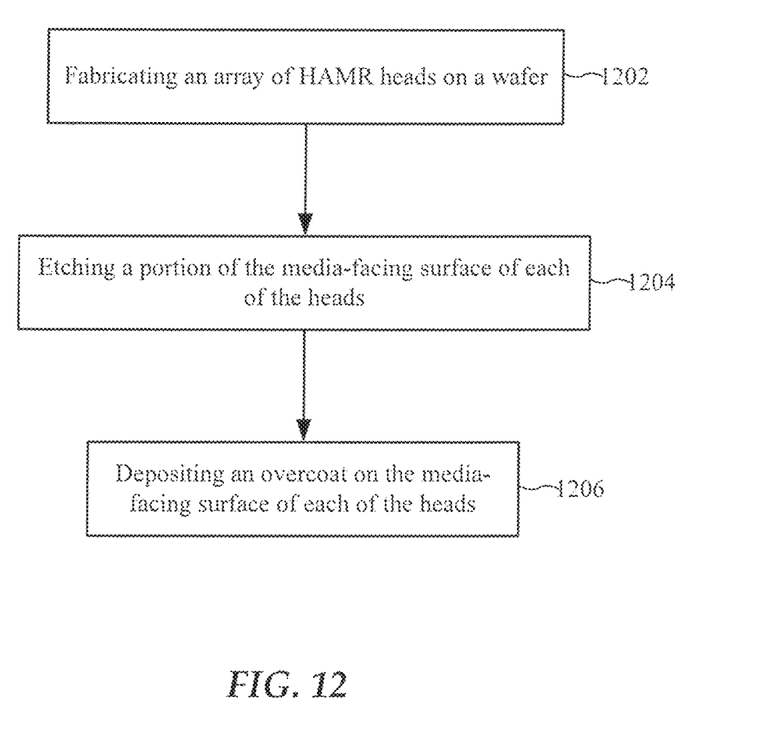
FIG. 12 is a flow diagram illustrating how to form a recessed portion of a slider in accordance with various embodiments.

FIG. 12 describes a process for making a slider with a stepped recession, as described in the embodiments above. The method involves fabricating an array of HAMR heads on a wafer. The fabrication can involve a variety of processing steps including several thin film depositions. Each of the fabricated heads comprises an exposed media-facing surface. The stepped recession can be formed at different times in the fabrication process; however, it is typically formed at the slider-level or bar-level process stage. Thus, after fabrication, the array of heads may optionally be separated into a plurality of bars, where each bar comprises a plurality of heads. The array of heads, either grouped as a wafer or as a plurality of bars, undergoes an etch process (e.g., via photolithography) to a portion of the media-facing surface of each head. Once the stepped recession is formed by etching a portion of the media-facing surfaces, an overcoat is deposited on the media-facing surfaces of each of the heads. The overcoat is a diamond like carbon overcoat or a carbon-less overcoat used in HAMR technology. The deposition results in a stepped overcoat, or stepped recession, forming a differential topography of the ABS. By controlling the etch rates for the ABS materials (e.g., dielectric and/or read/write components), the amount of the recession can be controlled. For example, the step can be etched to about 2 nm or less than 3 nm lower than the original ABS (e.g., the non-etched portion of the media-facing surface) of the heads. As described above, a stepped recession in the slider ABS can facilitate a lower fly-height, which decreases operating temperature and increases reliability for the slider.

Systems, devices, or methods disclosed herein may include one or more of the features, structures, methods, or combinations thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments. Accordingly, the scope of the present disclosure should not be limited by the particular embodiments described above, but should be defined only by the claims set forth below and equivalents thereof.

What is claimed is:

1. An apparatus, comprising:
   a slider configured for heat-assisted magnetic recording and comprising a media-facing surface;
   one or more reader elements positioned in a reader region of the slider, the one or more reader elements having a passive average first elevation at the media-facing surface; and
   one or more writer elements positioned in a writer region of the slider, the one or more writer elements having a passive average second elevation at the media-facing surface, the passive average second elevation being less than the passive average first elevation.

2. The apparatus of claim 1, wherein the one or more writer elements comprise a first return pole and a leading shield.

3. The apparatus of claim 1, wherein the one or more reader elements comprise a first return pole and a leading shield.

4. The apparatus of claim 1, wherein the one or more writer elements comprise a second return pole and a writer thermal sensor.

5. The apparatus of claim 1, wherein the passive second average elevation is about 2 nm less than the passive first average elevation.

6. The apparatus of claim 1, wherein the passive second average elevation is less than 3 nm less than the passive first average elevation.

7. The apparatus of claim 1, wherein the writer region and the reader region share a stepped interface.

8. The apparatus of claim 1, wherein the writer region comprises a dielectric material at the media-facing surface and the reader region comprises the dielectric material at the media-facing surface.

9. The apparatus of claim 1, further comprising an overcoat disposed on the media-facing surface.

10. An apparatus, comprising:
    a slider configured for heat-assisted magnetic recording and comprising a media-facing surface;
    a reader positioned in a reader region of the slider, the reader region comprising a dielectric material at the media-facing surface at a passive first elevation; and
    a writer and a near-field transducer positioned in a writer region of the slider, the writer region comprising the dielectric material at the media-facing surface at a passive second elevation, the passive second elevation being less than the passive first elevation.

11. The apparatus of claim 10, wherein the passive second elevation is about 2 nm less than the passive first elevation.

12. The apparatus of claim 10, wherein the passive second elevation is less than 3 nm less than the passive first elevation.

13. The apparatus of claim 10, further comprising an overcoat disposed on the media-facing surface.

14. The apparatus of claim 10, further comprising a first return pole and a leading shield, both positioned in the writer region.

15. The apparatus of claim 10, further comprising a first return pole and a leading shield, both positioned in the reader region.

16. The apparatus of claim 10, wherein the writer region and the reader region share a stepped interface.

17. An apparatus, comprising:
    a slider configured for heat-assisted magnetic recording;
    one or more reader elements positioned in a reader region of the slider, the reader region extending across the crosstrack dimension of the slider and configured to have a first passive fly-height with respect to a medium; and
    one or more writer elements positioned in a writer region of the slider, the writer region extending across the crosstrack dimension of the slider and configured to have a second passive fly-height with respect to the medium, the second passive fly-height being greater than the first passive fly-height.

18. The apparatus of claim 17, wherein the writer region and the reader region share a stepped interface.

19. The apparatus of claim 17, wherein the second passive fly-height is about 2 nm more than the first passive fly-height.

20. The method of claim 17, wherein the second passive fly-height is not more than 3 nm greater than the first passive fly-height.

* * * * *